(12) United States Patent
Roscoe et al.

(10) Patent No.: US 7,687,176 B2
(45) Date of Patent: Mar. 30, 2010

(54) FUEL CELL

(75) Inventors: Stephen B. Roscoe, St. Paul, MN (US);
Neal A. Rakow, Woodbury, MN (US);
Radoslav Atanasoski, Edina, MN (US);
Eric R. Jackson, Woodbury, MN (US);
John H. Thomas, III, City of Grant, MN (US); Lester H. McIntosh, III, Green Lane, PA (US)

(73) Assignee: 3M Innovative Properties Company, St. Paul, MN (US)

( * ) Notice: Subject to any disclaimer, the term of this patent is extended or adjusted under 35 U.S.C. 154(b) by 690 days.

(21) Appl. No.: 11/008,826

(22) Filed: Dec. 10, 2004

(65) Prior Publication Data
US 2006/0127729 A1 Jun. 15, 2006

(51) Int. Cl.
*H01M 2/02* (2006.01)
*H01M 8/00* (2006.01)
*H01M 4/00* (2006.01)

(52) U.S. Cl. .............................. 429/34; 429/12; 429/13; 429/40

(58) Field of Classification Search .................. 429/34, 429/12, 13, 40
See application file for complete search history.

(56) References Cited

U.S. PATENT DOCUMENTS

| | | | |
|---|---|---|---|
| 5,338,430 A | | 8/1994 | Parsonage et al. |
| 5,350,643 A | * | 9/1994 | Imahashi et al. ............... 429/33 |
| 5,482,792 A | | 1/1996 | Faita et al. |
| 5,493,126 A | * | 2/1996 | Taylor et al. ............. 250/504 R |
| 5,607,785 A | * | 3/1997 | Tozawa et al. ................. 429/33 |
| 5,718,976 A | * | 2/1998 | Dorfman et al. ............. 428/408 |
| 5,763,765 A | | 6/1998 | Lamont et al. |
| 5,879,827 A | | 3/1999 | Debe et al. |
| 5,879,828 A | | 3/1999 | Debe et al. |
| 6,016,190 A | | 1/2000 | Glazman |
| 6,040,077 A | | 3/2000 | Debe et al. |
| 6,187,164 B1 | | 2/2001 | Warren et al. |
| 6,207,310 B1 | | 3/2001 | Wilson et al. |
| 6,482,763 B2 | | 11/2002 | Haugen et al. |
| 2002/0004453 A1 | | 1/2002 | Haugen et al. |

(Continued)

FOREIGN PATENT DOCUMENTS

WO   WO 99/34206 A1   7/1999

(Continued)

OTHER PUBLICATIONS

Dahn et al., "Economical Sputtering System to Produce Large-Size Composition-Spread Libraries Having Linear and Orthogonal Stoichiometry Variations", Chemical Materials, (2002), pp. 3519-3523, vol. 14, No. 8, American Chemical Society.

(Continued)

*Primary Examiner*—Patrick Ryan
*Assistant Examiner*—Helen O Conley

(57) ABSTRACT

A fuel cell comprising a membrane electrode assembly, and an IR transmissive window for thermographic analysis of a surface of the membrane electrode assembly is described. The test fuel cell provides a method of monitoring a fuel cell, and capturing a thermographic profile of said fuel cell with an IR detector array, while simultaneously measuring the electrochemical output of the cell, including current, voltages and half cell potentials.

30 Claims, 4 Drawing Sheets

U.S. PATENT DOCUMENTS

| | | |
|---|---|---|
| 2004/0048113 A1 | 3/2004 | Murphy et al. |
| 2004/0096716 A1 | 5/2004 | Pierpont et al. |
| 2004/0096725 A1 | 5/2004 | Mao et al. |
| 2004/0121210 A1 | 6/2004 | Hamrock et al. |

FOREIGN PATENT DOCUMENTS

| | | |
|---|---|---|
| WO | WO 01/48839 A2 | 7/2001 |
| WO | WO 01/68236 A2 | 9/2001 |
| WO | WO 02/05367 A2 | 1/2002 |
| WO | WO 02/06807 A2 | 1/2002 |
| WO | WO 03/087885 A2 | 10/2003 |
| WO | WO 2004/045013 A2 | 5/2004 |
| WO | WO 2004/047212 A2 | 6/2004 |
| WO | WO 2004/070864 A2 | 8/2004 |

OTHER PUBLICATIONS

Moates et al., "Infrared Thermographic Screening of Combinatorial Libraries of Heterogeneous Catalysts", Ind. Eng. Chem. Res., (1996), pp. 4801-4803, vol. 35, No. 12, American Chemical Society.

Holzwarth et al., "Detection of Catalytic Activity in Combinatorial Libraries of Heterogeneous Catalysts by IR Thermography", Angew. Chem. Int. Ed., (1998), pp. 2644-2647, vol. 37, No. 19, Wiley-VCH Verlag GmbH, D-69451 Weinheim.

Jiang et al., "A Combinatorial Approach Toward Electrochemical Analysis", Journal of Electroanalytical Chemistry, (2002), pp. 137-142, vol. 527, Elsevier Science B.V.

Taylor et al., "Thermographic Selection of Effective Catalysts from an Encoded Polymer-Bound Library", Science, (Apr. 10, 1998), pp. 267-270, vol. 280.

Reddington et al., "Combinatorial Electrochemistry: A Highly Parallel, Optical Screening Method for Discovery of Better Electrocatalysts", Science, (Jun. 12, 1998), pp. 1735-1737, vol. 280.

Hakenjos et al., "A PEM Fuel Cell for Combined Measurement of Current and Temperature Distribution, and Flow Field Flooding", Journal of Power Sources, (2004), pp. 213-216, vol. 131, Elsevier B.V.

Yamada et al., "High-Throughput Screening of PEMFC Anode Catalysts by IR Thermography", Applied Surface Science, (2004), pp. 220-223, vol. 223, Elsevier B. V.

U.S. Appl. No. 10/944,998, filed Sep. 20, 2004 entitled "Durable Fuel Cell".

U.S. Appl. No. 10/945,178, filed Sep. 20, 2004 entitled "Fuel Cell Durability".

Hakenjos et al., "Spatially resolved measurement of PEM fuel cells," Journal of Power Sources, Elsevier, Amsterdam, Netherlands; vol. 145, No. 2, Aug. 18, 2005, pp. 307-311.

Shimoi, et al., "Visualization of the Membrane Temperature Field of a Polymer Electrolyte Fuel Cell," Journal of Energy Resources Technology, vol. 126, Dec. 2004, pp. 258-261.

* cited by examiner

FUEL CELL

This invention was made with Government support under (Cooperative Agreement DE-FC-36-02AL67621) awarded by DOE. The Government has certain rights in this invention.

BACKGROUND

The present invention is directed to optical infrared thermography, and the use thereof in monitoring, measuring and characterizing the performance of a fuel cell.

Optical pyrometry has been used effectively for measuring the surface temperatures of various materials, particularly incandescent materials, and in evaluating catalytic activity, reactivity of monomers or other reactants, the rates of reactions, or reaction conditions of thin film samples. Typically a thin film sample is evaluated and the temperatures of the samples are recorded. Higher peak temperatures, for example, have been used to screen various catalysts, with those samples exhibiting higher peak temperatures presumed to have higher catalytic activity under a given set of conditions.

Electrochemical cells, including proton exchange membrane fuel cells, sensors, electrolyzers, and electrochemical reactors, are known in the art. Typically, the central component of such a cell is a membrane electrode assembly, comprising two catalyzing electrodes separated by an ion-conducting membrane (ICM, also called PEM for proton exchange membrane), often referred to as a Membrane Electrode Assembly (MEA). In a fuel cell, the MEA is sandwiched between two porous, electrically-conductive backing layers to form a 5-layer assembly. When the 3-layer MEA comprises a central polymeric membrane, the fuel cell is often referred to as a polymer electrolyte membrane fuel cell (PEMFC). In a typical low-temperature fuel cell, hydrogen gas is oxidized at the anode and oxygen gas (usually as air) is reduced at the cathode:

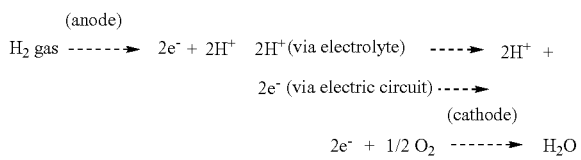

PEMFCs are seen as a potential energy source for, e.g., electric vehicles, since PEMFCs have been shown to exhibit high-energy conversion efficiency, high power density and negligible pollution. In a vehicle such as an automobile, one convenient source of hydrogen gas can be the steam reformation of methanol, since methanol can be stored more easily in a vehicle than hydrogen.

However, the high cost and performance problems of existing fuel cells have inhibited widespread commercial adaptation. Considerable effort continues in the development of new materials and construction, but testing of new fuel cells and components thereof, under operating conditions is a difficult challenge.

SUMMARY

The present invention provides a fuel cell comprising a membrane electrode assembly, and an IR transmissive window for thermographic analysis of a surface of the membrane electrode assembly. The present invention also provides a method of monitoring a fuel cell, and capturing a thermographic profile of said fuel cell with an IR detector array, while simultaneously measuring the electrochemical output of the cell, including current, voltages and half cell potentials.

The present invention overcomes a problem in the art by providing a test fuel cell having an IR transmissive window, whereby materials of construction (including catalysis and membranes) and dimensions of components may be tested under operating conditions; i.e. where reactants are consumed and electrical power is generated. The present invention allows evaluation of a fuel cell by obtaining a thermographic profile of a surface of the membrane electrode assembly while simultaneously measuring the electrical output, i.e. voltage, and/or current.

As used herein, a thermogram or thermographic profile refers to the temperature profile of a fuel cell at a plurality of points on one or more surfaces of the fuel cell MEA, i.e. a "temperature map" of a surface of the membrane electrode assembly. A thermographic profile may be distinguished from the result obtained from single point optical pyrometry, which measures the temperature at a single point, or an average temperature of a surface.

Each thermographic profile may be captured at a single point in time, or as a function of time. When captured as a function of time, individual points on a surface of the MEA may be analyzed, and the results compared over time. Individual points may be compared at a particular time to determine how the electrochemical reaction varies at different points on a MEA.

The fuel cell and method of the invention may be used to optimize materials, components, the size and configuration of components, fuels, oxidants, and amounts thereof, uniformity of gas flow, by comparing the associated thermographic profiles while (optionally) measuring the current and/or voltage. The thermographic profile may also be used to determine defects resulting from manufacturing processes, such as in the pinholes in the MEA, or non-uniform catalyst layers.

DETAILED DESCRIPTION

Figure 1:
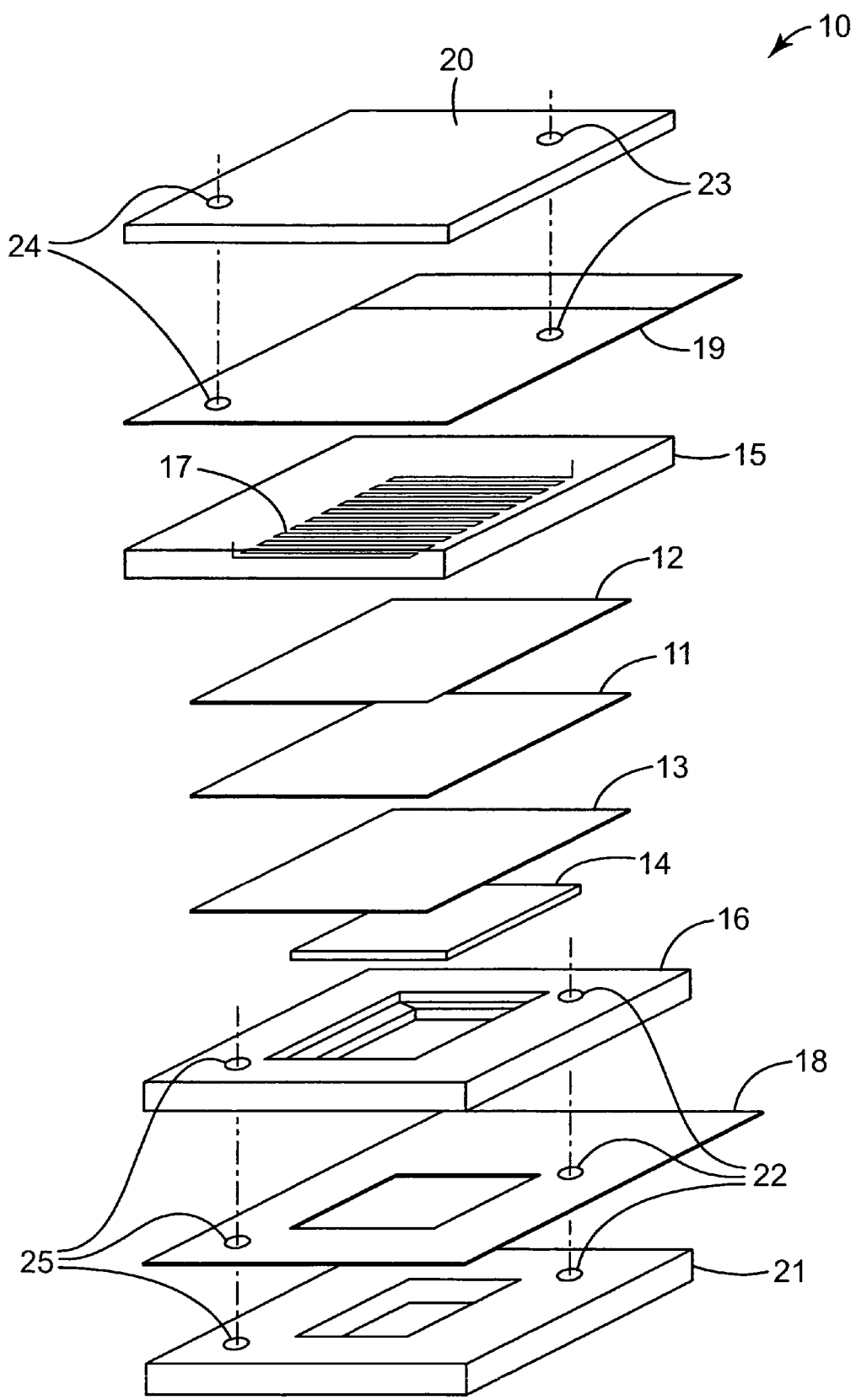
FIG. 1 is an exploded view of a fuel cell of the invention.

The present invention provides a fuel cell comprising a membrane electrode assembly, and an IR transmissive window for thermographic analysis of a surface of the membrane electrode assembly. In one embodiment the fuel cell MEA may be a "five-layer membrane electrode assembly" comprising:

a) a first current collector,
b) a membrane electrode assembly, and
c) a second current collector, wherein the IR transmissive window is disposed adjacent said first current collector.

Any suitable ion conducting membrane (ICM) may be used in the practice of the present invention. The polymer electrolytes useful in the present invention are typically preferably copolymers of tetrafluoroethylene and one or more fluorinated, acid-functional comonomers. Typically the polymer electrolyte bears sulfonate functional groups. The ICM typically has a thickness of less than 50 µm, more typically less than 40 µm, more typically less than 30 µm, and most typically about 25 µm. The ICM is typically comprised of a polymer electrolyte that is an acid-functional fluoropolymer, such as Nafion™ (DuPont Chemicals, Wilmington Del.) and Flemion™ (Asahi Glass Co. Ltd., Tokyo, Japan). Most typically the polymer electrolyte is Nafion™. The polymer electrolyte typically has an acid equivalent weight of 1200 or less, more typically 1100 or less, more typically 1050 or less, and most typically about 1000 or less.

One useful membrane comprises a polymer that comprises bound anionic functional groups and manganese or ruthenium cations such as is described in U.S. Ser. No. 10/945,178, incorporated herein by reference. Another useful membrane comprises a highly fluorinated (typically perfluorinated) polymer electrolyte and at least one manganese oxide, wherein the distribution of the manganese oxide across the thickness of the polymer electrolyte membrane is uniform, such as is described in U.S. Ser. No. 10/944,998, incorporated herein by reference. Another useful membrane comprises a polymer comprising a highly fluorinated backbone and at least one pendant group comprising pendent groups of the formula $-O-CF_2-CF_2-CF_2-CF_2-SO_3H$, such as is described in U.S. 2004/0121210, incorporated herein by reference.

IR thermographic analysis of the fuel cell may be used to screen various materials used for the ICM, and thicknesses and dimension thereof. For example the thermograms of fuel cells having different ICM materials or dimensions may be compared. Defects resulting from of manufacturing processes may be identified by "hot spots" that appear in the thermographic profile as resulting from the fuel and oxidant combining.

Any suitable catalyst may be used in the practice of the present invention, including (for the anode) Pt, Ru, Hf, Mo, Sn, and alloys and mixtures of other precious and non-precious metals and oxyhydroxides thereof, and from Pt, and other precious and transition metals, alloys and mixtures thereof, metal containing nanoparticles, as well as non-precious metal catalysts. Reference may be made to U.S. 2002/0004453, U.S. Pat. No. 6,040,077 and U.S. Pat. No. 5,879,827

Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Conventional catalyst alloy particles are typically prepared by wet chemical or metallurgical methods and supported on conventional carbon support particles. Conventional particles have a homogeneous composition representative of the alloy stoichiometry, a generally spherical morphology indicative of the crystallite growth habit of particles produced by conventional methods, and are randomly distributed over the surface of a larger support particle. The catalyst particles may also be used without a support as a "black". Such particles are reported to be in the 2 to 25 nm size range and they increase in diameter as the amount of catalyst per support particle increases.

In some embodiments, fuel cell MEAs may be constructed using catalyst electrodes in the form of applied dispersions of either Pt fines or carbon supported Pt catalysts. These conventional catalysts are applied in an ink or paste-containing electrolyte to either the ICM or to a backing layer placed adjacent to the membrane. The dominant catalyst form used for hydrogen-fuel polymer electrolyte membranes is Pt or Pt alloys coated onto larger carbon particles by wet chemical methods, such as the reduction of chloroplatinic acid. This conventional form of catalyst is dispersed with ionomeric binders, solvents and often polytetrafluoroethylene (PTFE) particles, to form an ink, paste or dispersion that is applied to either the membrane, or the electrode backing material. In addition to mechanical support, it is generally believed in the art that the carbon support particles provide necessary electrical conductivity within the electrode layer.

Typically, the catalyst is applied to the ICM or to the current collector in the form of a catalyst ink. The catalyst ink typically comprises polymer electrolyte material, which may or may not be the same polymer electrolyte material that comprises the ICM. The polymer electrolyte is typically an acid-functional fluoropolymer, such as Nafion™ and Flemion™. The polymer electrolytes useful in inks for use in the present invention are typically preferably copolymers of tetrafluoroethylene and one or more fluorinated, acid-functional comonomers. Typically the polymer electrolyte bears sulfonate functional groups. Most typically the polymer electrolyte is Nafion™. The polymer electrolyte typically has an equivalent weight of 1200 or less, more typically 1100 or less, more typically 1050 or less, and most typically about 700. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such as glycerin and ethylene glycol. The water, alcohol, and polyalcohol content may be adjusted to alter Theological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

The catalyst may be applied to the ICM or the current collector by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

In another embodiment, a catalyst metal salt may be reduced in an organic solution of a solid polymer electrolyte to form a distribution of catalyst metal particles in the electrolyte, without a support particle, which is then cast onto an electrode-backing layer to form the catalyst electrode.

In a further embodiment, Pt fines are mixed directly with a solution of solvents and polymer electrolyte and coated onto the electrode-backing layer. However, because of limitations on how small the fines can be made and the stability of the dispersion, this approach results in very high, and therefore expensive, loading of the catalyst.

Various other structures and means have been used to apply or otherwise bring a catalyst in contact with an electrolyte to form electrodes. These MEAs can include: (a) porous metal films or planar distributions of metal particles or carbon supported catalyst powders deposited on the surface of the ICM; (b) metal grids or meshes deposited on or imbedded in the ICM; or (c) catalytically active nanostructured composite elements embedded in the surface of the ICM.

Alternately, a catalyst coated membrane (CCM) may be made using a nanostructured catalyst, as disclosed in U.S. Pat. No. 5,338,430 (nanostructured electrodes embedded in solid polymer electrolyte) or U.S. Pat. No. 5,879,828 (MEA's having electrode layers comprising nanostructured elements).

In a particularly useful embodiment, a test catalyst sample may vary in composition. In this embodiment, the composition may vary from one area of the planar catalyst surface to another. For example, a two dimensional catalyst surface may comprise 100% of catalyst X and 0% catalyst Y at one edge of the sample, and 0% catalyst X and 100% catalyst Y at the opposite edge of the sample, with a gradient concentration of the two catalysts therebetween along an axis between the two edges. If desired, a third catalyst component Z may be varied between 0% and some preselected value along an orthogonal axis. The thermographic profile, and therefore the entire range of concentrations of X, Y and Z, may be captured and the performance of the catalysts determined.

In addition to samples that vary as a concentration of catalyst across the sample, the sample may vary in the thickness of the catalyst layer, and type of support used. Samples having a gradient composition may be prepared using the techniques described in J. R. Dahn et al., *Chemistry of Materials,* 14, 3519 (2002), and by other techniques referenced therein.

Any suitable current collector (also described as a fluid transport layer or FTL) may be used in the practice of the present invention. The current collectors are selected to 1) maximize the electrical contact with the electrodes thereby minimizing the resistivity due to long transverse paths of current in the electrodes, 2) lower resistance with contact with the backing plates, 3) transfer heat from the MEA to the backing plates, 4) allow flow of reactants (fuel and oxidant) with minimal pressure drop and uniform distribution of reactants on the surface of the MEA, 5) allow easy removal of reaction products, such as water, 6) be electrochemically stable under the reaction conditions of the half cell and 7) allow direct or indirect observation of the thermal emissions of the MEA through the IR transmissive window.

The use of metal meshes for current collectors in fuel cells is known in the art (see U.S. Pat. No. 6,207,310 (Wilson et al.), and U.S. Pat. No. 5,482,792 (Faita et al.), incorporated herein by reference). Gold and platinum screens have been advantageously used, as the metals are stable on both the anode and cathode sides of the MEA. Additionally, metal coating on other mesh materials, such as gold on tungsten, may also be used.

Current collectors comprising sheet materials of carbon fibers are also known. Typically such current collectors are a carbon fiber construction selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, AVCARB 1071 HCB carbon impregnated cloth (commercially available from Ballard Material Products, Inc. and the like. The current collector may be coated or impregnated with various materials, including carbon particle coatings, hydrophilizing treatments, and hydrophobizing treatments such as coating with polytetrafluoroethylene (PTFE).

Carbon cloths and paper provide good conductivity, but block direct transmission of the IR radiation from the MEA through the IR transmissive window. However, despite the lack of a free optical path, such materials may be used advantageously. It has been found that a thermographic profile may be indirectly obtained, as the IR radiation from the MEA heats the adjacent current collector, which in turn transmits IR radiation through the window to the IR detector array. Advantageously, both may comprise a metal wire screen.

With the current collector that is disposed between the MEA and the IR transmissive window, there is a compromise between maximizing the electrical contact and maximizing the IR transmission. Better IR transmission demands a more open mesh (thinner wires spaced further apart) however this naturally leads to higher electrical impedance and lower current. A more conductive metal is advantageous, however it must also be electrochemically stable, thus copper and silver, two very conductive metals are not suitable for the cathode side of the MEA, but may be used for the anode side.

The first collector layer that is disposed between the MEA and the IR transmissive window, preferably has an open mesh structure such that the IR radiation from the MEA may be transmitted through the current collector essentially unobstructed. The first current collector layer should transmit at least 20% of the IR radiation, preferably at least 40% and most preferably at least 60% of the IR radiation. The second current collector may have an open mesh structure or a closed structure lacking a free optical path (such as carbon paper).

The fuel cell may be used to screen various materials used for the current collector, and thicknesses and dimension thereof.

The MEA is typically sandwiched between two rigid plates, known as distribution plates. At least one of such plates has an IR transmissive window for capturing the thermographic profile of the MEA. Like the current collector, the distribution plate may be electrically conductive. The distribution plate is typically made of a carbon composite, metal, or plated metal material. The distribution plate distributes reactant or product fluids to and from the MEA electrode surfaces, typically through one or more fluid-conducting channels formed in the surface(s) facing the MEA(s). These channels comprise a flow field. The areas between channels on the face of the distribution plate are called "land areas." These land areas are in electrical contact with the MEA and conduct electric current to and from the electrodes of the MEA. Generally, the distribution plate having the window has no such channels, although they may be machined into the IR transmissive window. Fuel cells may be constructed using unitized fuel cell assemblies as disclosed in U.S. patent application Ser. No. 10/295,292 and 10/295,518, the disclosures of which are incorporated herein by reference.

FIG. 1 illustrates a test fuel cell of the invention. Test cell 10 comprises a membrane electrode assembly (MEA) 11 having a catalyst layer on both major surfaces. In the Figure, either of the major surfaces may be the anode or cathode, respectively. In electrical contact with MEA 11 are two current collectors 12 and 13, each of which may have an open or closed structure as described. Preferably current collector 13 is an open, conductive mesh structure in registration with the IR transmissive window 14. Current collector 13 is in electrical contact with distribution plate 16 having IR transmissive window 14 in registration with the MEA 11. The surface of distribution plate 16 remote from current collector 13 is in electrical contact with electrical contact 18, for connection to an electrical load such as a potentiostat. Electrical contact 18 is depicted as substantially rectangular and having a greater area such that a lip is provided for electrical connections, and an aperture therethrough in registration with window 14. Other shapes and sizes for contact 18 are contemplated provided they provide electrical connection and an optical path to current collector 13.

Current collector 12 is in electrical contact with the opposite face of MEA 11 and with distribution plate 15. Distribution plate 15 has channels 16 therein in registration with MEA 11 for uniform distribution of reactants to MEA 11. Electrical contact 19 contacts the outside surface of distribution plate 15 for providing electrical connection from the opposite electrode as electrical contact 18.

At the outermost faces of the fuel cell are housing plates 20 and 21, which are provided with a sealing or compression means, such as through-bolts (not shown), for holding the components parts in registration and in electrical contact. Housing plate 21 has an aperture for providing an optical path (direct or indirect) of IR radiation from the surface of MEA 11 through window 14 to an IR detector array. The housing plates 20 and 21, but preferably housing plate 21, may be provided with an insulating layer (not shown) for reducing heat exchange from the faces of the plate (at the periphery). Housing plates 20 and 21 are further provided with reactant inlets 22 and 23 for introduction of reactant(s) to the surface of MEA 11 and outlets 24 and 25 for removal of products. Housing plates further provide an engagement means for releasably coupling the first and second distribution plates, to allow replacement of a component of said fuel cell. Inlets 22 and 23 and outlets 24 and 24 are depicted at opposite corners of each face of the fuel cell, but other configurations are contemplated. The housing plates may be made from any materials including metals, such as aluminum, or composites such as epoxy composites. One such useful composite is a glass cloth-epoxy composite (G11, available from Polymer Plastics Corporation, Mountain View, Calif.), due to the desirable low thermal conductivity.

The fuel cell generally contains sealants and/or gaskets (not shown) between the layers such as are known in the art. The fuel cell may further comprise a heat exchanger (not shown), such as a resistive heating element (or cooling element) for maintaining the fuel cell at a desired, typically elevated, temperature. The heater is generally attached to the exposed face of housing plate 20, and may also be attached to the periphery (the area around the aperture) of housing plate 21.

Figure 2:
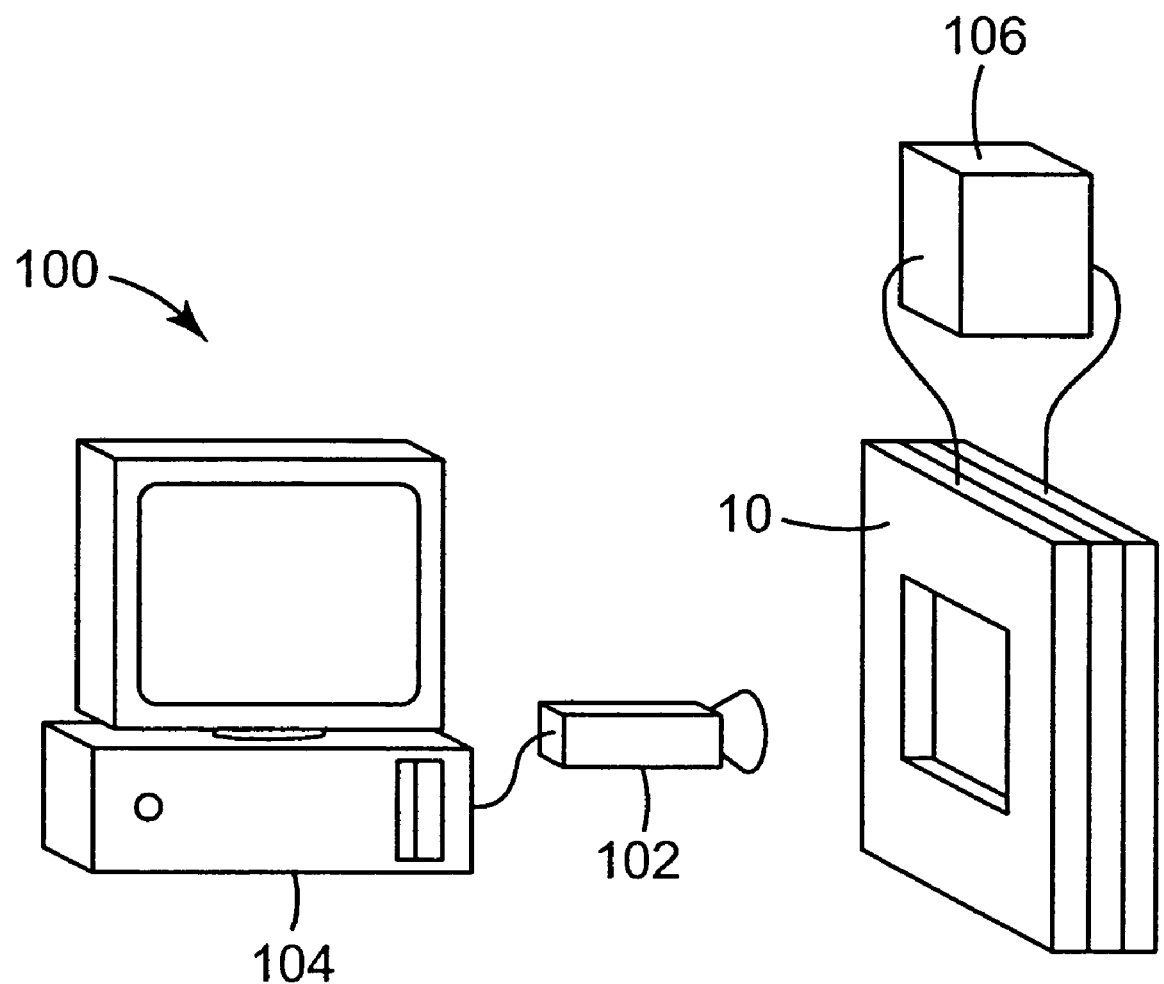
FIG. 2 is a schematic of a fuel cell used in the method of the invention.

The thermographic image of the sample(s) may be captured with an IR detector array, which may comprise an infrared pyrometer array (i.e. two or more IR pyrometers), an infrared camera, and preferably a digital infrared camera. FIG. 2 is illustrative of a typical experimental scheme 100 used in the method of the invention. The thermographic profile of fuel cell 10 is captured with IR detector array 102, which is illustrated as interfaced with computer 104 for data collection and analysis. IR detector 102 is preferably an IR digital camera, wherein each pixel may be "mapped" to a point on the surface of the MEA of fuel cell 10 for capture of multiple points. As shown, IR detector 102 is oriented substantially perpendicular to the MEA surface of fuel cell 10. Although a single detector 102 is shown, a plurality of detectors, oriented to opposite surfaces of the MEA of fuel cell 10 are contemplated, as described herein. Also depicted is electrical load 106, which may be used to provide electrical information such as voltages (including half-cell potentials) or current. If desired, the system may further comprise a fuel cell mount (not shown) for maintaining the fuel cell 10 at a preselected distance and orientation to the detector array 102.

An initial thermographic profile of cell 10 may be captured for subtraction from later obtained thermographic profiles. Data obtained may be collected, and plotted by computer 104. Images may be captured as a function of time, to create a "normalized" video, where the electrochemical reaction, and any defects in the materials of construction may be noted. This sample may be compared with other samples that vary as to component parts, fuel, oxidant, pressure, or temperature, ambient or operational temperature, relative humidity of the incoming gasses, presence of contaminants in the fuel or oxidant, among other variables.

It is especially useful to obtain a thermographic profile under conditions that approximate actual operating conditions, i.e. under electrical load. In general, a fuel cell is heated to a desired temperature using external heaters, fuel and oxidant are introduced to the cell, and a first thermographic profile obtained. The cell is then connected to an electrical load, and operated, for example, under constant current conditions. A second thermographic profile is obtained, from which the first thermographic profile is subtracted. The sequence of profile may be reversed if desired, i.e. the cell may be heated under electrical load, a thermographic profile obtained, and the load removed, then a second profile obtained. These techniques allow one to reduce the differences due to differing thermal emissivities of different materials, such as different catalysts. The techniques also correct for thermal artifacts (e.g. reflections) and/or identify regions of condensation that may arise during measurement.

The detectors should have a useful temperature range of from about −20° C. to about 250° C., preferably from about 20° C. to about 200° C. The detectors should further have a temperature resolution of ±0.5° C., preferably ±0.1° C. and most preferably ±0.02° C. One or more detectors may be used.

Pyrometers are non-contact temperature sensors that measure temperature from the amount of thermal electromagnetic radiation received from a spot on the sample. This group of sensors includes both spot or "point" measuring devices in addition to line measuring radiation thermometers, which produce 1-D and, with known relative motion, can produce 2-D temperature distributions, and thermal imaging, or area measuring, thermometers which measure over an area from which the resulting image can be displayed as a 2-D temperature map of the region viewed. IR optical pyrometers are sensitive to infrared wavelengths and typically convert the input wavelength to an optical or electronic output by means of an IC, resistance temperature detector or thermocouple. In this context, infrared optical pyrometers are not to be confused with other optical pyrometers that measure temperatures of very hot objects (>700° C.) based upon their visible light emission due to incandescence. Useful IR pyrometers will measure infrared output between 6-14 micrometers in the IR and generally have a useful temperature range of −20 to 538° C.; well beyond that required for measuring the exothermicity of electrochemical reactions using the method of the invention. One useful IR pyrometer is an Omega Industrial IR thermometer (OS552-V1-6).

The majority of devices in use are single waveband thermometers (they measure a portion of the received thermal radiation in a single waveband, or portion of the infrared part of the electromagnetic spectrum). However, the number of ratio thermometers (two color pyrometers) on the market has grown considerably. Single waveband radiation thermometers are usually referred to a blackbody source in order to provide accurate surface temperature measurements.

An infrared camera may be a line-scan camera in which a linear array of sensors is translated across the focal plane of the camera to produce a two-dimensional image, or it can contain a two-dimensional array of sensors. Linear arrays may be 120 pixels or more, while two-dimensional arrays are commonly 120 pixels×120 pixels, 256 pixels×256 pixels, 240 pixels×320 pixels or sometimes more.

The sensor elements can be microbolometers, in which the infrared radiation impinging on a micro-machined pad alters the resistance of a circuit, a thermoelectric sensor in which the micro-machined pad contains the hot electrode of a thermocouple, or a pyroelectric sensor in which radiative heating of the pad causes a change in capacitance. Thermal sensors of these kinds are usually sensitive to infrared light in the long wavelength range of 8-14 micrometers, although pyroelectric sensors may be used across a much wider range of wavelengths, even into the near IR. Alternatively, the sensor element may be a photoelectric material such as indium antimonide (InSb), mercury cadmium telluride (MCT), platinum silicide (PtSi), lead selenide (PbSe) and others, which are generally used to detect infrared radiation between 3 and 5 micrometers. Gallium arsenide (GaAs) has also been used to create an IR detector array sensitive to 0.9-1.7 micrometers. A third type of sensor element is the quantum well infrared photodetector (QWIP) that operates at wavelengths of 8-9 micrometers. It should be noted that thermal sensors may be operated at room temperature, unlike photoelectric sensors and QWIPs that are usually cooled to near liquid nitrogen temperatures to achieve the optimal sensitivity. Some photometric sensors (e.g.: PbSe) that are designed to be sensitive to the near-IR may be operated at ambient temperatures. Cameras may also be radiometric, in which they are calibrated against a blackbody and thus able to give the real surface temperature of an object (assuming various parameters such as emissivity, distance etc. are known) or not. The thermal sensitivity varies with sensor type and manufacturer, but is generally on the order of 20 mK (InSb, MCT, QWIP) or higher. The thermal sensitivity, or net equivalent temperature difference (NETD), varies.

In principle, blackbody radiation is emitted at shorter wavelengths as the emitting body gets hotter and thus cameras sensitive to shorter wavelengths are more commonly used for hotter bodies. However, the optimal camera for any given application will be a function of sensitivity, image stability, measured temperature range, desired image resolution (number of pixels), frame rate, and emissivities and transparencies of anticipated materials in the relevant wavelength range, as well as reliability and cost.

It will be understood that a thermographic image or profile does not reveal the true temperature of the sample. For non-contact optical methods used to measure temperature, Planck's law for blackbody radiation provides the emission intensity of a "perfect" blackbody as a function of temperature and wavelength. As the MEA surfaces evaluated with the method of the invention are not perfect blackbodies, they emit less radiation at any given wavelength and temperature that Planck's law would predict. The ratio of the actual emission to the predicted blackbody emission is the emissivity, and depends on the wavelength, the temperature as well as the composition of the sample and the surface characteristics.

In many instances it is not necessary to know the actual temperature of the sample. It may suffice to observe that one sample reaches a higher temperature indicated of greater catalytic activity (or one area of a sample reaches a higher temperature), or emits heat more uniformly than another sample. Thus the empirical differences in temperatures between samples, or between selected areas or points of a sample may provide the necessary information regarding the sample(s).

If the actual temperature is desired, it may be estimated by measuring the emissivity of a sample, and comparing the results with the thermographic profile obtained during a screening experiment. Other methods of determining the emissivity of a sample, and the actual temperature are disclosed in WO 03/087,885 and U.S. Pat. No. 6,016,190 (Glazman), incorporated herein by reference. Careful calibration would require evaluating emissivity within the container of use.

Typical commercial cameras are available from vendors such as FLIR Systems, Electrophysics Corp., Infrared Solutions, Inc., CMC Electronics, Mikron and others. Note that not all IR cameras are video cameras, some only record still images. The output signal can displayed on a screen on the camera, saved to memory (onboard RAM or an ancillary memory device), provided to a personal computer through a Firewire™, frame-grabber interface, or for higher frame rates or larger arrays it can be communicated through a high speed interface to a dedicated computer, such as is available from Dolch Computer Systems.

Since IR images are commonly output as 12- or 14-bit data files, many commercial image-handling packages are not applicable. Consequently cameras generally come with their own manufacturer's proprietary software packages. Standard features include the ability to subtract one image from another, or from a string of images to create a "normalized" video, identification of maximum and minimum temperatures within an image (or a defined region or line), the ability to track the temperature of a given pixel through a sequence of images (a video) generating a time/temperature profile, a variety of false color palettes, and many other functions. Thus the software allows one to map a selected sample area, and to plot the data as a function of time.

The IR detector array is normally oriented substantially perpendicular to the surface of the MEA of the fuel cell. Optionally thermographic profiles of the opposite surfaces can also be captured if the fuel cell is supplied with an IR transmissive window on the opposite face. Multiple points on surfaces other than the MEA surface may be monitored. Additionally, one or more points on the opposite faces of the MEA may be monitored and the thermographic profiles captured.

The points which are monitored, and which result in the thermographic profile, may vary considerable in size depending on the resolution of the IR detector used, and the distance of the detector from the sample(s). Infrared pyrometers for example, typically have relatively low resolution, so relatively large surface areas of a sample surface are monitored, but typically less than 5 millimeters. Multiple pyrometers may be used to form an array for monitoring several points on a sample. Modern digital IR cameras however, have very high resolution, allowing multiple points of very small areas to be monitored, thus a digital IR camera itself constitutes an IR detector array. Each pixel of a digital IR camera may be "mapped" to a sample point, each corresponding to an area of 100 micrometers or smaller. Some commercially available digital IR cameras allow resolution of 10 micrometers, with further advances in resolution expected.

The IR detector is generally oriented along a focal path substantially perpendicular to that MEA, While the relative orientation of the irradiation source and the IR detector need not be exactly 90°, it is preferred that they are oriented within ±45°, more preferably within ±25°, most preferably within ±10°. If desired, an initial thermographic profile, under some preselected initial conditions, may be captured, and then "subtracted" from later captured thermographic profiles, to better illustrate the change in temperature of the samples. For example, the sample may be heated to a first temperature, the thermographic profile captured, and this image subtracted from later thermographic profiles captured during polymerizations.

The IR detector array is generally spaced from the sample(s) at a distance such that the IR cell, more particularly the MEA, substantially fills the field of view. Alternatively, the detector array is spaced from the fuel cell at the minimum focal length to maximize resulution. Fiber optics may be advantageously used if a detector array is to be spaced apart from the experimental apparatus.

Common IR-transmissive materials include quartz, sapphire, zinc sulfide (ZnS) and selenide (ZnSe), germanium (Ge), arsenic sulfide ($As_2S_3$), gallium arsenide GaAs, indium gallium arsenide (InGaAs), along with a variety of more complicated materials, e.g.: AMTIR-1™ (an amorphous glass of the formula $Ge_{33}As_{12}Se_{55}$, available from Amorphous Materials, Inc, Garland, Tex.). Other classes of infrared transparent materials include simple halide salts, NaCl, NaI etc.; $CaF_2$ being one of the most popular.

Different materials transmit infrared radiation at different regions of the infrared spectrum, and thus are suitable for use with different IR detectors, therefore the transmissivity of the window and IR detector should be matched. For application in a fuel cell, other parameters besides transmissivity are important for the window material.

Electrochemical stability of the window is desired; oxidative or reductive depending upon whether it is mounted on the cathode or anode side. Hydrolytic stability is also desired, as the fuel cells release water as a product, and the MEA typically comprises the highly acidic fluorinated sulfonic acids. Operating conditions for fuel cells may include greater than 100% humidity at temperatures from 70° C. to 150° C. or even higher. Thus germanium may not be a desirable material for a fuel cell cathode window since it is not oxidatively stable under these conditions, although it is suitable for the anode. In addition, fuel cells are typically clamped together, thus the window material preferably possesses a significant degree of mechanical strength. In particular, the use of a metal screen for the current collector adjacent the window may put mechanical stresses on the window.

Transparency in the visible region of the spectrum is also beneficial, since it allows direct observation of the interior of the cell and direct, real-time comparison of visible and infrared images. Due to performance criteria of IR-transmission, strength, and electrochemical/hydrolytic stability, quartz and sapphire are preferred.

Further, the thermal conductivity of the window should be considered. For example, the relatively high thermal conductivity of sapphire can lead to a pronounced temperature gradient across the window when using aluminum housing plates, as much as 8° C. at a temperature of 75° C. In practice, the effect of this temperature gradient can be largely removed by digital background subtraction, however greater reproducibility and repeatability of results may be achieved by diminishing the gradient by using a material of low thermal conductivity for the housing plate rather than aluminum. A demonstrative example of low conductivity materials is the glass-polymer composite G11 which doesn't transfer heat to the window as quickly, resulting in a temperature difference of only 5° C. under comparable conditions. Insulating or actively heating the aluminum housing plate may reduce thermal effects. Note that the thermal conductivity and diffusivity of ZnSe are close to that of sapphire, and thus it is expected to behave similarly. Quartz, however, is much less conductive and is observed to result in a reduced gradient.

Some useful materials, and their properties are shown in the table below. IR transmittance was measured by infrared spectroscopy for quartz and sapphire. All other data was obtained from vendors of these materials.

| Property | Quartz | Germanium | AMTIR | ZnSe | ZnS | Sapphire |
|---|---|---|---|---|---|---|
| Solubility | soluble in strong base | soluble in hot $H_2SO_4$ and aqua-regia | soluble in strong base | soluble in strong acids | soluble in strong acids | virtually insoluble in acid or base |
| IR transmittance | >80% transmittance up to 4 µm | 40-45% transmittance over 2-18 mm | 60-65% transmittance up to 15 µm | 70-75% transmittance over 0.6-16 µm | >60% transmittance over 0.5-13 µm | 70-90% transmittance up to 5 µm |
| Knoop hardness | 740 psi | 550 psi | 170 psi | 150 psi | 160 psi | 1370 psi |
| Young's modulus | 335 Gpa | 102.7 Gpa | $3.2 \times 10^6$ psi | 67.2 Gpa | 74.5 Gpa | 335 Gpa |
| Modulus of Rupture | 1500 psi | 7000 psi | 2700 psi | 8000 psi | 10,000 psi, | 65,000 psi |
| Refractive Index | 1.4 at 2.5 µm | 4.0 at 2.5 µm 52.9 @ 10.6 µm | 2.6055 @ 1.0 µm, 2.4977 @ 10.0 µm | 2.4 at 10.6 µm | 2.19 at 10.5 µm | 1.73 at 2.5 µm |
| Reflection loss (2 surfaces) | | | | 29% at 10.6 µm | 24% at 10.6 µm | 13% at 3 µm |
| Thermal conductivity | 1.2 W/mK | 60 W/mK | 0.2 W/mK | 18 W/mK | 27 W/mK | 22-40 W/mK |
| Coefficient of thermal expansion @ 25 C. | $11 \times 10^{-6}$ | $6 \times 10^{-6}$ | $12 \times 10^{-6}$ | $7 \times 10^{-6}$ | $6 \times 10^{-6}$. | $6\text{-}8 \times 10^{-6}$ |

Simultaneously with the capture of the thermographic profiles, other analytical techniques may be employed to characterize the reactants, products, kinetics or mechanical properties of the samples. For example, reactants flow rates, pressures and partial pressures, humidity levels, and cell temperature can be varied. In addition, gasses or fluids containing catalyst poisons can be introduced in order to test certain parts/segments of the catalysts.

The performance of a cell is checked by simultaneously measuring the voltage and the current output at given testing conditions (load, reactants flow rates, pressure, partial pressure/activity of reactants, temperature, humidity, etc.). In order to emphasize or determine and record the activity of the MEA/catalyst more appropriately, either the current or the voltage can be varied independently. This is achieved by adjusting outputs of electrical instruments such as variable loads, power supplies or potentiostats.

EXAMPLES

These examples are merely for illustrative purposes only and are not meant to be limiting on the scope of the appended claims. All parts, percentages, ratios, etc. in the examples and the rest of the specification are by weight, unless noted otherwise. All chemicals were obtained from Sigma-Aldrich Chemicals, Milwaukee, Wis. unless otherwise noted. The data has been collected assuming the samples have an emissivity of one.

Example 1

Figure 3:
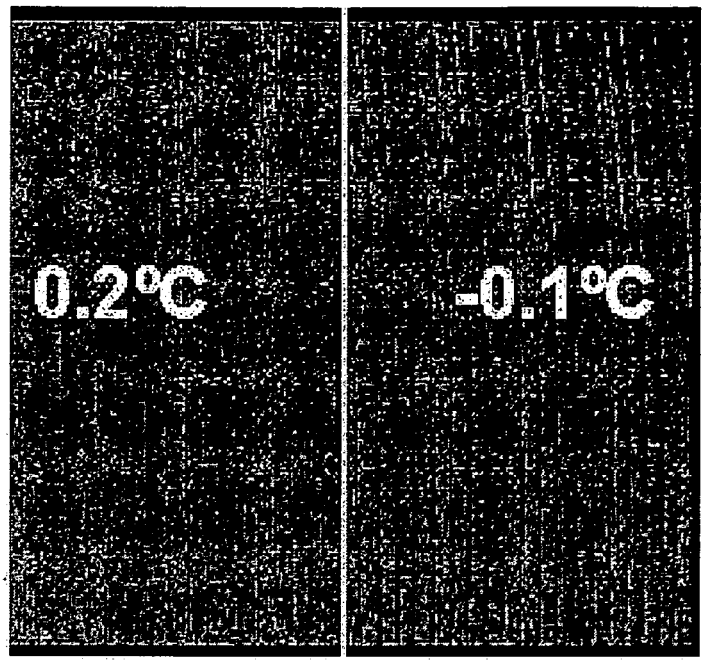
FIGS. 3 and 4 are digital images of the thermographic profiles of Example 1.
Figure 4:
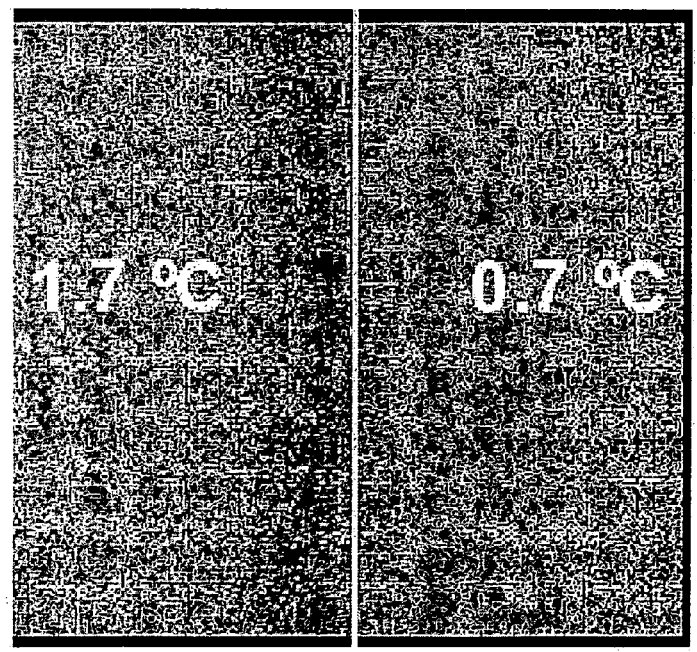

A test fuel cell was prepared according to FIG. 1. The cathode side was prepared by cutting a 5-centimeter×5-centimeter (2 inch×2 inch) window in the end plate electrode and graphite block. The graphite block was additionally cut to provide a ledge on which a GE 214 quartz window was affixed with epoxy cement. The dual tasks of current collector and flow field were provided by a fine platinum screen (52 mesh, 0.1 mm diameter wire) placed between the MEA and the graphite block. The platinum screen covered the same area as the MEA, and extended beyond the quartz window so that it formed electrical contact with the graphite block. The anode side, comprising aluminum end plate, gold coated electrode with insulating layer, graphite block with machined flow field and Toray paper current collector was left unchanged from a conventional cell. A flexible silicone heater was adhered to the outer face of the end plate for temperature control. An MEA was prepared from two separate pieces, one of which was coated on the cathode side with a high activity catalyst (Pt), and the other with a low activity catalyst (PtHf). Using the cell described above, the sample was imaged at room temperature with no current flowing (background), and then with 0.5 amps and 4.0 amps with a FLIR SC1100 IR camera (FLIR Systems, Boston Mass.). FIG. 3 shows the background-subtracted thermogram with 0.5 amps and FIG. 4 shows the background-subtracted thermogram with 4.0 amps.

Example 2

Figure 5:
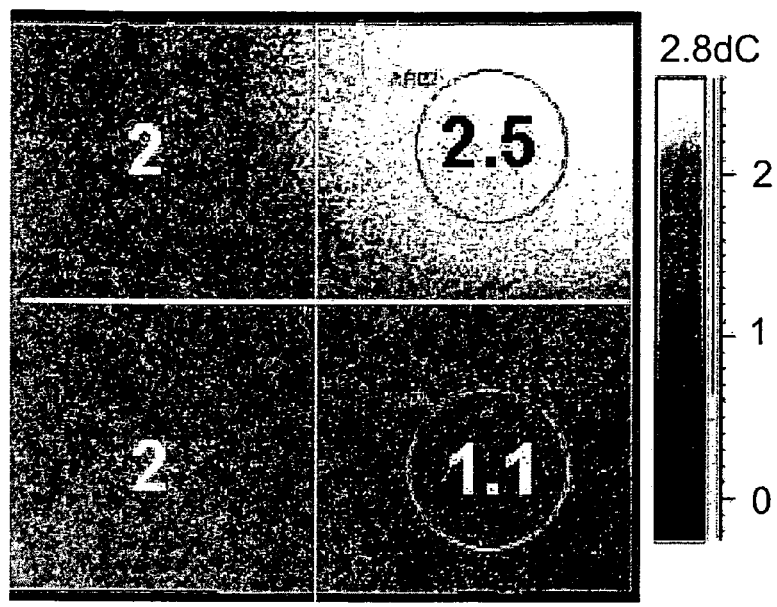
FIG. 5 is a digital image of the thermographic profile of Example 2.

A test cell similar to the one described in Example 1 above was assembled except the MEA was prepared with four different materials in the four quadrants. The four materials were PtMnFe, PtCoFe, PtNiFe and PtHf. The FLIR SC1000 camera (FLIR Systems, Boston Mass.), with a field of view of roughly one square inch, was centered on the intersection of the four quadrants and then defocused slightly to eliminate the lines due to the platinum screen. The cell was heated to 76° C. and a background image was recorded without applied voltage once the cell temperature had stabilized. Images were then recorded at constant voltages of 0.8 Volts, 0.7 Volts, 0.6 Volts, 0.5 Volts and 0.45 Volts. FIG. 5 shows the background-subtracted thermograms at these voltages.

Example 3

Figure 6:
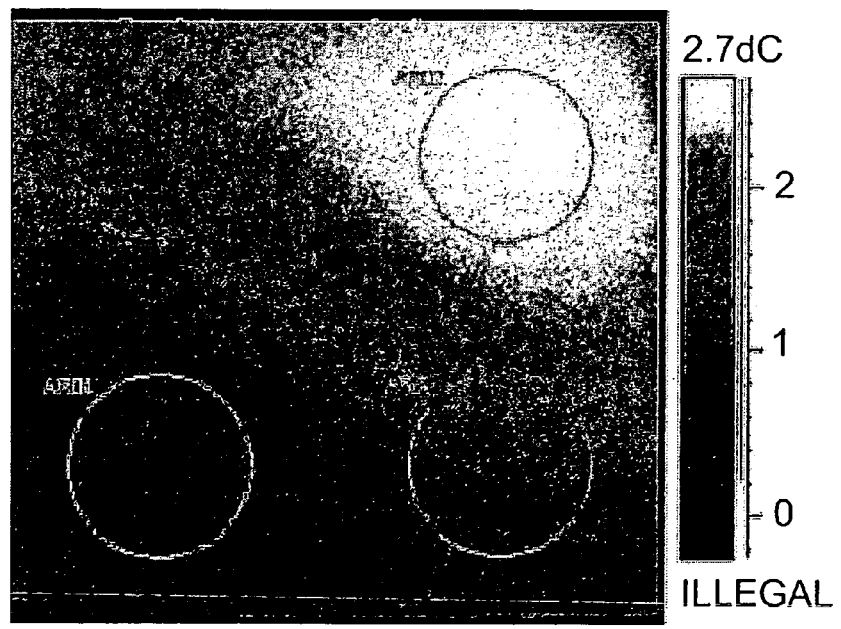
FIG. 6 is a digital image of the thermographic profile of Example 3.

A test cell was prepared similar to that described in Example 1 above but with two differences. First, the cathode side of the MEA was coated with 110 alternating layers of platinum and 80% Ni/20% Fe alloy (permalloy), sputter-coated as described in J. R. Dahn et al., Chem. Mater., 2002, 14, 3519-3523. The thickness of each platinum layer varied linearly from 0 to 11 angstroms (left to right) and each permalloy layer varied linearly from 0 to 6 angstroms (bottom to top), respectively, yielding perpendicular composition gradients. Second, a piece of AVCARB 1071 HCB carbon impregnated cloth (commercially available from Ballard Material Products, Inc. formerly Textron Systems Corporation; Lowell, Mass.) was placed between the MEA and the platinum mesh screen. The FLIR SC1000 camera (FLIR Systems, Boston Mass.), with a field of view of roughly one square inch, was centered on the upper right quadrant (where carbon cloth covers the platinum and permalloy-rich portion of the MEA) and then defocused slightly to eliminate the lines due to the platinum screen. A background image was recorded at room temperature. FIG. 6 shows the background-subtracted thermogram recorded at 0.4V. The largest temperature difference is observed in the carbon cloth covering the most platinum and permalloy-rich corner of the MEA.

What is claimed is:
1. A fuel cell comprising:
a membrane electrode assembly,
a first current collector layer having an open mesh structure such that at least 60 percent of an IR transmission can be transmitted,
a second current collector layer, and
an IR transmissive window for thermographic analysis of a surface of the membrane electrode assembly,
wherein the membrane electrode assembly comprises an ion-conducting membrane having a first catalyst layer on a first major surface of the ion-conducting membrane defining a first catalyst surface and a second catalyst layer on a second major surface of the ion-conducting membrane defining a second catalyst surface, wherein the first catalyst layer is an anode layer and the second catalyst layer is the cathode layer, wherein the anode layer, the cathode layer, or a combination thereof comprises a gradient concentration of a catalyst from one area on the catalyst surface to another area on the same catalyst surface.

2. The fuel cell of claim 1, wherein the first current collector layer is in electrical contact with the anode layer, the second current collector layer is in electrical contact with the cathode layer, and the IR transmissive window is disposed adjacent to the first current collector layer or the second current collector layer such that the first current collector layer or the second current collector layer is positioned between the IR transmissive window and the membrane electrode assembly.

3. The fuel cell of claim 1, wherein the IR transmissive window is positioned on an anode layer side of the membrane electrode assembly.

4. The fuel cell of claim 1, wherein the IR transmissive window is positioned on a cathode layer side of the membrane electrode assembly.

5. The fuel cell of claim 2, further comprising:
a) a first distribution plate in electrical contact with the first current collector layer; and
b) a second distribution plate in electrical contact with the second current collector layer.

6. The fuel cell of claim 5, wherein the first distribution plate contains the IR transmissive window.

7. The fuel cell of claim 2, wherein the IR transmissive window is adjacent to the first current collector layer, and the first current collector layer is IR transmissive.

8. The fuel cell of claim 2, wherein the IR transmissive window is adjacent to the second current collector layer, and the second current collector layer is IR transmissive.

9. The fuel cell of claim 1, wherein the IR transmissive window comprises a quartz or sapphire window.

10. The fuel cell of claim 5, wherein the first distribution plate has an inlet port, an outlet port, or a combination thereof.

11. The fuel cell of claim 5, wherein the second distribution plate has an inlet port, an outlet port, or a combination thereof.

12. The fuel cell of claim 5, wherein the second distribution plate has channels therein for directing a flow of a fuel, an oxidant, or a combination thereof.

13. The fuel cell of claim 5, further comprising a first housing plate adjacent to the first distribution plate, and a second housing plate adjacent to the second distribution plate.

14. The fuel cell of claim 13, wherein the first housing plate, the second housing plate, or a combination thereof comprises an engagement means for releasably coupling the first distribution plate and the second distribution plate.

15. The fuel cell of claim 1, wherein the anode layer comprises Pt, Ru, Hf, Mo, Sn, or combinations thereof.

16. The fuel cell of claim 1, wherein the cathode layer comprises Pt.

17. The fuel cell of claim 1, wherein the ion exchange membrane comprises an acid functional fluoropolymer.

18. A method of testing a fuel cell comprising:
providing a fuel cell, the fuel cell comprising:
- a membrane electrode assembly,
  - a first current collector layer having an open mesh structure such that at least 60 percent of an IR transmission can be transmitted,
  - a second current collector layer, and
  - an IR transmissive window,
  - wherein the membrane electrode assembly comprises an ion-conducting membrane having a first catalyst layer on a first major surface of the ion-conducting membrane defining a first catalyst surface and a second catalyst layer on a second major surface of the ion-conducting membrane defining a second catalyst surface, wherein the first catalyst layer is an anode layer and the second catalyst layer is the cathode layer, wherein the anode layer, the cathode layer, or a combination thereof comprises a gradient concentration of a catalyst from one area on the catalyst surface to another area on the same catalyst surface
- introducing a fuel and an oxidant to the fuel cell; and
- capturing a thermographic profile of a surface of the membrane electrode assembly with an infrared detector array through the IR transmissive window.

19. The method of claim 18, wherein the thermographic profile is captured as a function of time.

20. The method of claim 18, wherein the thermographic profile is captured by a digital infrared camera having a plurality of pixels corresponding to a plurality of locations on the surface of the membrane electrode assembly.

21. The method of claim 18, wherein the thermographic profile is captured by an IR detector adapted for a plurality of outputs corresponding to a plurality of locations on the surface of the membrane electrode assembly.

22. The method of claim 18, wherein an electrical output of the fuel cell is monitored concurrently with the thermographic profile.

23. The method of claim 18, further comprising introducing the fuel and the oxidant into the fuel cell to generate a current.

24. The method of claim 18, wherein a half-cell potential of the anode layer, the cathode layer, or a combination thereof is recorded.

25. The method of claim 18 comprising obtaining a first thermographic profile while the fuel cell is connected to an electrical load, removing the electrical load, obtaining a second thermographic profile, and subtracting the second thermographic profile from the first thermographic profile.

26. The method of claim 25, wherein the first thermographic profile and the second thermographic profile are obtained at a constant elevated temperature.

27. The method of claim 18, wherein the thermographic profile is obtained under a constant current.

28. The method of claim 18, wherein the thermographic profile is obtained under a constant voltage.

29. The method of claim 18 wherein the thermographic profile is obtained at an elevated temperature.

30. A system for obtaining a thermographic profile of a fuel cell comprising:
- a fuel cell comprising:
  - a membrane electrode assembly,
  - a first current collector layer having an open mesh structure such that at least 60 percent of an IR transmission can be transmitted,
  - a second current collector layer, and
  - an IR transmissive window,
  - wherein the membrane electrode assembly comprises an ion-conducting membrane having a first catalyst layer on a first major surface of the ion-conducting membrane defining a first catalyst surface and a second catalyst layer on a second major surface of the ion-conducting membrane defining a second catalyst surface, wherein the first catalyst layer is an anode layer and the second catalyst layer is the cathode layer, and, wherein the anode layer, the cathode layer, or a combination thereof comprises a gradient concentration of a catalyst from one area on the catalyst surface to another area on the same catalyst surface; and
- an infrared detector array.

* * * * *

UNITED STATES PATENT AND TRADEMARK OFFICE
CERTIFICATE OF CORRECTION

| | | |
|---|---|---|
| PATENT NO. | : 7,687,176 B2 | Page 1 of 1 |
| APPLICATION NO. | : 11/008826 | |
| DATED | : March 30, 2010 | |
| INVENTOR(S) | : Stephen Barrie Roscoe | |

It is certified that error appears in the above-identified patent and that said Letters Patent is hereby corrected as shown below:

Column 3

Line 44; after "827" insert -- . --.

Column 4

Line 31; delete "Theological" and insert -- rheological --, therefor.

Column 10

Line 61; delete "resulution." and insert -- resolution. --, therefor.

Column 16

Line 34; Claim 30, delete "and," and insert -- and --, therefor.

Signed and Sealed this
Fifth Day of April, 2011

David J. Kappos
*Director of the United States Patent and Trademark Office*